US008010842B2

(12) United States Patent
Krivopaltsev et al.

(10) Patent No.: US 8,010,842 B2
(45) Date of Patent: Aug. 30, 2011

(54) INTELLIGENT MOBILE DEVICE MANAGEMENT CLIENT

(75) Inventors: Eugene Krivopaltsev, San Jose, CA (US); Gregory D. Buzzard, Aptos, CA (US); Manuel Roman, Barcelona (ES); Shahid Shoaib, Mountain View, CA (US); Michael Diener, Berlin (DE)

(73) Assignee: Innopath Software, Inc., Sunnyvale, CA (US)

( * ) Notice: Subject to any disclaimer, the term of this patent is extended or adjusted under 35 U.S.C. 154(b) by 201 days.

(21) Appl. No.: 12/203,828

(22) Filed: Sep. 3, 2008

(65) Prior Publication Data

US 2010/0037088 A1 Feb. 11, 2010

Related U.S. Application Data

(63) Continuation-in-part of application No. 12/188,936, filed on Aug. 8, 2008.

(51) Int. Cl.
*G06F 11/00* (2006.01)
(52) U.S. Cl. ......................................................... 714/26
(58) Field of Classification Search .............. 714/18–22, 714/25–28, 30–33, 37–39, 43, 44
See application file for complete search history.

(56) References Cited

U.S. PATENT DOCUMENTS

| 6,794,849 | B2 * | 9/2004 | Mori et al. | 320/107 |
| 2006/0064486 | A1 * | 3/2006 | Baron et al. | 709/224 |
| 2007/0207800 | A1 * | 9/2007 | Daley et al. | 455/425 |
| 2008/0070495 | A1 * | 3/2008 | Stricklen et al. | 455/3.01 |
| 2009/0040947 | A1 * | 2/2009 | Krivopaltsev | 370/255 |
| 2009/0044185 | A1 * | 2/2009 | Krivopaltsev | 717/173 |
| 2009/0049518 | A1 * | 2/2009 | Roman et al. | 726/1 |

OTHER PUBLICATIONS

Form PCT/ISA/220, "PCT Notification of Transmittal of the International Search Report and the Written Opinion of the International Searching Authority, or the Declaration," 1 pg.
Form PCT/ISA/210, "PCT International Search Report," 3 pgs.
Form PCT/ISA/237, "PCT Written Opinion of the International Searching Authority," 5 pgs.

* cited by examiner

*Primary Examiner* — Nadeem Iqbal
(74) *Attorney, Agent, or Firm* — Gregory & Sawrie LLP

(57) ABSTRACT

Embodiments of an intelligent agent for an OMA DM enabled mobile client device are described. The intelligent agent includes modules for storing management property values in one or more nodes of an OMA DM management tree of the mobile client device. At least some of the management values are analyzed and set in a server computer coupled to the mobile client device over a wireless network. The intelligent mobile client is configured to manage itself based on initial instructions and policies provided by a server that are transferred to the client by the OMA DM protocol. For example, a client might notice that the battery is nearly empty and so it automatically decreases its own backlight illumination level. The intelligent agent defines a set of management properties to include a status property representing a node severity value, and a property group consisting of a rule, an action property representing an action that is executed if the rule is satisfied, and a threshold value that represents a minimum value that is used as a rule parameter.

23 Claims, 9 Drawing Sheets

INTELLIGENT MOBILE DEVICE MANAGEMENT CLIENT

CROSS-REFERENCE TO RELATED APPLICATIONS

This application is a Continuation-in-Part application of U.S. patent application Ser. No. 12/188,936, entitled "Managing and Enforcing Policies on Mobile Devices," filed Aug. 8, 2008, and which is assigned to the assignee of the present invention.

TECHNICAL FIELD

Embodiments are described relating to telecommunication devices, and more specifically to intelligent mobile client devices for use in global networks.

BACKGROUND

The basic functionality of a typical mobile phone has gone through dramatic changes from being solely voice oriented to being capable to support complex features and rich data intensive applications. It is expected that this trend of increased complexity and capability of mobile devices will continue and drive significant increases in product and service innovation. In many respects, mobile device management is quite similar to classic enterprise management. It includes provisioning, which is the ability to setup a new device or service for a mobile subscriber, firmware and software lifecycle management, which includes the delivery, configuration and retirement of new or updated programs and data, remote diagnostics of phone features, software and network connectivity, asset management, reporting and other features. To ensure ease of use, a combination of intelligent management, proactive monitoring and diagnostics is a necessity for wireless/mobile operators.

Present system, network and enterprise management solutions are typically based on a protocol which defines two key items, a PDU (protocol data unit), which describes the content that is passed between a managed object and its manager, and a data model that uniquely describes the location and structure of managed objects. For mobile devices, the preeminent standard is OMA DM (the Open Mobile Alliance's Device Management) standard. Typically, a carrier runs one or more instances of an MDM (mobile device management) platform to manage associated mobile devices. The OMA DM protocol leverages the popular browser-client web-server interaction model and HTTP transport mechanisms. Interactions between the management platform and device may be initiated by either the server (management platform) or the client (mobile device). A client initiated interaction follows the familiar paradigm of a web browser initiating a session with a web server. When the server wishes to initiate an interaction, it must start by notifying the client so that the client can once again initiate a browser-like session with the server. This server-to-client notification is carried via an SMS (short message service) communications channel text message that is specially recognized by the mobile device and routed to the OMA DM client software so that it may establish a session with the server. Once the SMS-based notification is received, a client-to-server session is established and proceeds in the same manner as for a client initiated interaction.

In an MDM system, remote devices may be controlled in a number of different ways. The two fundamental dimensions of control are usage control and operational control. Usage control pertains to control over application and services available to and executed on, or accessed by the device. Examples of usage control include a service operator restricting usage of certain applications so that only applications that have been paid for may be used on a given device, a subscribing parent (referred to as a master subscriber) attempting to ensure that their child does not use the music player or game application on their cell phone while at school, or an enterprise dictating that their employees' cell phones vibrate, rather than ring, when they are in executive meeting rooms, and other similar application controls. Operational control pertains to the operation of the device itself, and the various hardware elements of the device, such as power, input/output, and transceiver circuits. Examples of operational control include limiting device power consumption if the battery is running low, increasing radio sensitivity if interference is detected, increasing speaker volume in noisy environments, and other similar operational characteristics.

At present, mobile devices are controlled almost exclusively by the user. That is, the user must manually set or modify operational settings, such as ring mode, speaker volume, keypad configuration, and so on. With regard to usage control, service providers are generally able to enable or disable certain functions on a remote device, but control is generally limited to simple on/off settings. Present devices do not support usage control based on dynamic or operational characteristics of the device. Consequently, such control requires user configuration. Thus, in order to enforce usage policies or rules, or set certain operational characteristics, a relatively high level of user input is required. As such, present mobile devices are passive devices that are not capable of significant autonomic operation, but instead require active monitoring and configuration by service providers and users.

In certain cases, standard management protocols may be used by a server to retrieve, analyze and set management properties values for a mobile client. The management property values can be stored within known structure, such as a device management tree. Though such server-driven management presents a mandatory channel, it implies that the server is the component primary responsible for taking management decisions for the mobile client. Such existing management paradigms can thus be viewed as reactive rather than proactive because management and monitoring is conducted after a problem is reported by a consumer.

What is needed, therefore, is a mobile device policy distribution and enforcement system that allows for autonomous control and operation of mobile devices.

What is further needed is a mobile device resident management framework that facilitates management of mobile devices based on operational and use conditions sensed on the mobile device.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of the invention as described herein provide a solution to the problems of conventional methods as stated above. In the following description, various examples are given for illustration, but none are intended to be limiting. Embodiments of an intelligent mobile client for use in large-scale distributed networks are described. The intelligent mobile client may be an OMA DM enabled mobile client device. An intelligent agent of the client includes modules for storing management property values in one or more nodes of an OMA DM management tree of the mobile client device. At least some of the management values are analyzed and set in a server computer coupled to the mobile client device over a wireless network. The intelligent mobile client is configured to manage itself based on initial instructions and policies provided by a server that are transferred to the client by the OMA DM protocol. For example, a client might notice that the battery is nearly empty and so it automatically decreases its own backlight illumination level.

Figure 1:
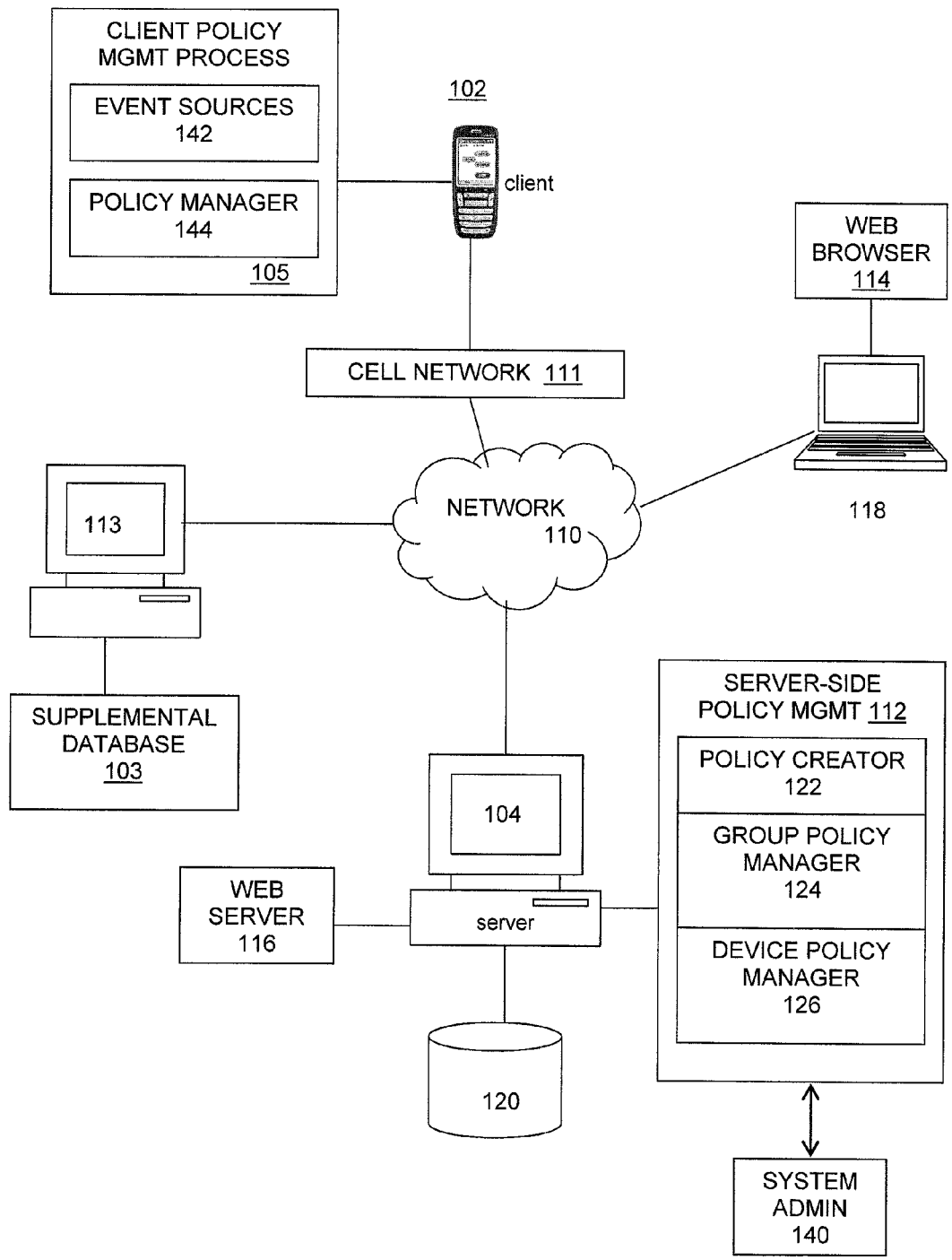
FIG. 1 illustrates a computer network system that implements one or more embodiments of a mobile policy management system for an intelligent mobile client.

Aspects of the one or more embodiments described herein may be implemented on one or more computers executing software instructions. The computers may be networked in a client-server arrangement or similar distributed computer network. FIG. 1 illustrates a computer network system 100 that implements one or more embodiments of a mobile policy management system. In system 100, a network server computer 104 is coupled, directly or indirectly, to one or more network client computers 102 and 118 through a network 110, and one or more possible other networks, such as cellular telephone network 111. The network interface between server computer 104 and client computer 102 may include one or more routers that serve to buffer and route the data transmitted between the server and client computers. Network 110 may be the Internet, a Wide Area Network (WAN), a Local Area Network (LAN), or any combination thereof.

In one embodiment, server 104 in network system 100 is a server that executes a server-side mobile device policy enforcement process 112. This process may represent one or more executable programs modules that are stored within network server 104 and executed locally within the server. Alternatively, however, it may be stored on a remote storage or processing device coupled to server 104 or network 110 and accessed by server 104 to be locally executed. In a further alternative embodiment, the policy management process 112 may be implemented in a plurality of different program modules, each of which may be executed by two or more distributed server computers coupled to each other, or to network 110 separately. The server and client computer may use a dedicated application program and API (application program interface) communication scheme.

In one embodiment, the client device 102 executes a client-side policy management system to interact with the server-side policy management process 112 and to allow autonomous control of the device. At least some of the management values are analyzed and stored in the server computer that is coupled to the mobile client device over a wireless network. The intelligent mobile client 102 is configured to manage itself based on initial instructions and policies provided by a server that are transferred to the client by using a defined network protocol that is optimized for remote device management. A separate content provider 103 may provide some of the data that is included in the policy management process. Data for any of the policies, business rules, and the like may be provided by a data store 120 closely or loosely coupled to any of the server 104 and/or client 102.

The client device is typically a mobile client device that provides various utilities, such as communication, entertainment, navigation, information management, and basic computing functions. Mobile client 102 may be a cell phone, smartphone, or any mobile communication device that provides access to the network 110 and has a sufficient degree of user input and processing capability to execute the client-side policy enforcement process 105. The client computer 102 may also be embodied in a standard mobile computing device 118 such as a notebook computer, personal digital assistant, game console, media playback unit, or similar computing device. The client computers 102 and 118 may be coupled to the server computer 104 over a wired connection, a wireless connection or any combination thereof. For example, if the mobile client 102 is a cell phone, access between the mobile device and network 110 will likely utilize a separate cell network 111 that is maintained by a telecommunications provider. For an embodiment in which network 110 is the Internet, network server 104 may execute a World-Wide Web (WWW) server process 116 that stores data in the form of web pages and transmits these pages as Hypertext Markup Language (HTML) files over the Internet 110 to the clients 102 and 118. For this embodiment, the client, such as client 118 may run a web browser program 114 to access the web pages served by server computer 104 and any available content provider or supplemental server 103.

As shown in FIG. 1, the server computer 104 executes a server-side policy management process 112. This process, along with the client-side process 105 comprises a policy management framework that allows management authorities (e.g., carrier and IT administrator) to control the behavior of mobile devices according to policies that determine aspects such as access control, resource and application utilization, operational characteristics, monitoring, and logging. The server-side process 112 provides functionality to create, edit, and submit policies to devices and then subsequently to manage and monitor these policies. The client-side process 105 then implements these policies and rules to autonomously control its own operational and usage functionality. In this manner, server 104 and/or any system administrator entity, as well as the user of mobile device 102 is only minimally involved with the operation of the device with respect to the defined policies and implementation thereof.

In general, policy management is the functionality that allows a management authority to define the behavior of a mobile device, so that it conforms to particular network or corporate device usage policy, or operates in accordance with defined operational constraints or principles. For example, an IT manager could specify that mobile device users are not allowed to use the Internet browser during working hours. Using the server-side policy management functionality, they can define a policy that specifies that the phone's browser cannot be launched during work hours (e.g., from 8 am to 5 pm from Monday to Friday). The server sends the policy to the mobile client, or otherwise makes it available to the client. The client-side policy management process 105 then installs the policy and enforces it. This enforcement means that if the user tries to start the browser during a time that is not allowed, the policy framework automatically prevents the browser from starting. Many different types of policies and rules may be defined by the system and enforced on the client device. In one embodiment, the policy management framework targets enterprise devices, such as smartphones that provide functionality to access the Internet, e-mail, and corporate databases, and in many cases store confidential data. Action rule management allows IT administrators to guarantee that these devices adhere to the company policies.

This framework provides an intelligent and autonomous system that allows mobile-devices to self-manage according to the behavior defined by the server, using flexible policies. This approach ensures efficient management without requiring extensive mobile device user input, and resource utilization such as network bandwidth, server power, memory, processor overhead, and other resources.

Client-Side Process

As stated above, the policy management framework consists of the server-side and client-side components. The server-side process provides functionality to create, edit, and distribute action rule sets. The client-side process provides functionality to activate, deactivate, list and enforce action rule sets on the client device.

In one embodiment, the client side process 105 enforces policies that are represented as action rules. Action rule enforcement requires functionality to deliver events, evaluate conditions, and trigger actions when a group of conditions evaluates to true. Furthermore, the client-side architecture must be able to monitor action rule compliance, and therefore, must detect and report violations.

Figure 2:
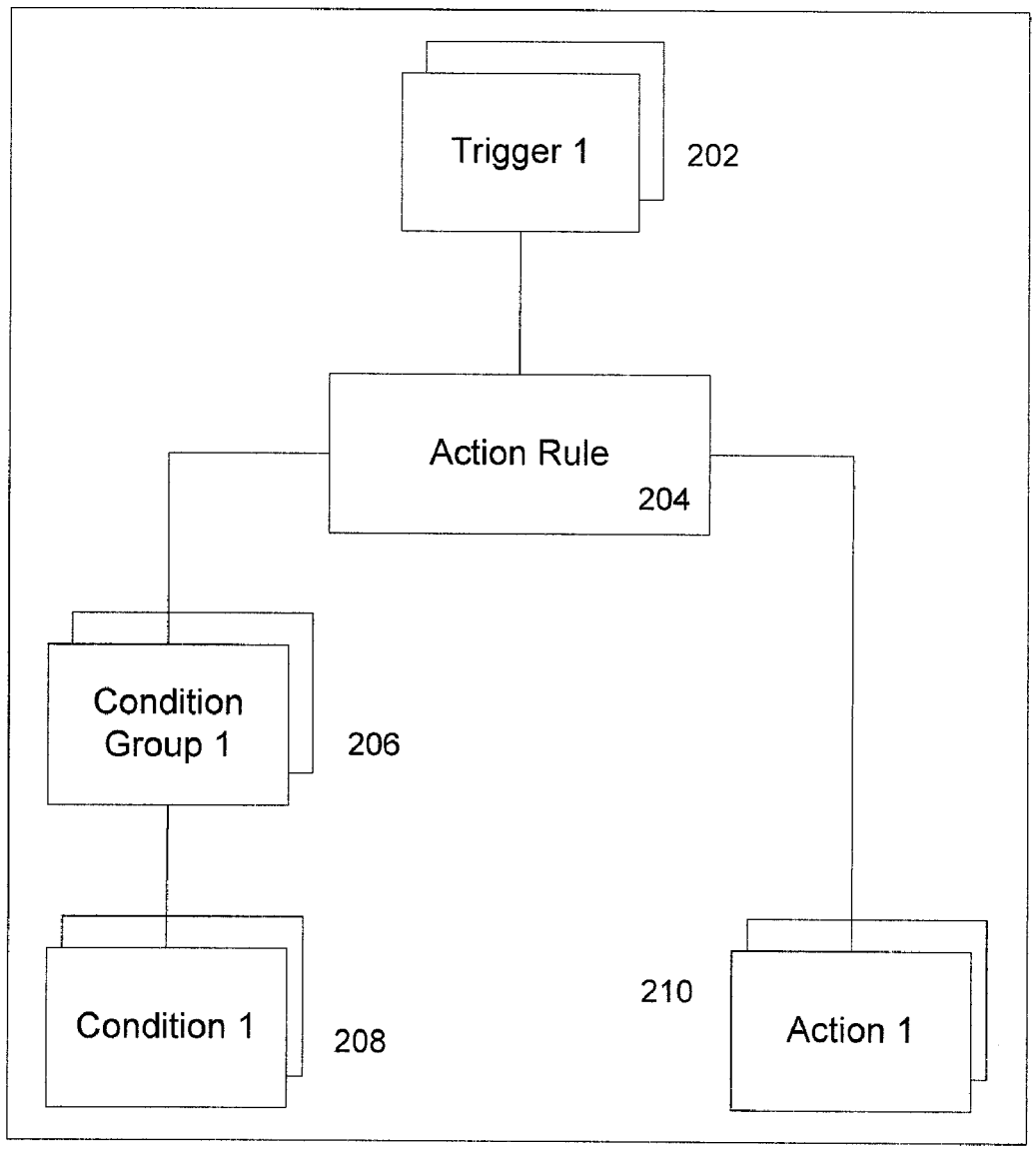
FIG. 2 illustrates the components of an action rule set for use with an intelligent mobile client, under an embodiment.

An action rule set is a collection of four types of components that enforce a specific behavior. These components are: the trigger, the condition group, the condition, and the action. FIG. 2 illustrates the four components of an action rule set, under an embodiment. As shown in FIG. 2, a trigger 202 is an event that denotes a change in the state of some variable of interest to the action rule 204. Triggers may be related to an operational characteristic of the device and/or a policy rule defined by the system. Some trigger examples include the battery level reaching certain percentage of charge, the device entering a specific location, or the time of day changing to set time, among others. When a trigger 202 notifies an action rule set 204, the action rule evaluates its predicate (conditions) 206. Several different conditions 208 may be organized into one or more condition groups 206. If a condition is true, the action rule 24 then causes execution of an associated action 210.

In one embodiment, each condition 208 comprises a Boolean expression, that is an expression that is either true ('1') or false (null or '0'). An example of a condition is batteryLevel<10%. Action rules can have any practical number 0-n conditions, and these conditions can be grouped together by condition groups 206. In general, an action 210 is a task that is executed when the action rule predicate evaluates to true. An example of an action may be the local device command "switchOffCamera". Thus, for example, if the trigger is the battery charge level, and the condition batteryLevel<10% is true, then the resulting action would be to turn off the camera component of the mobile device.

Figure 3:
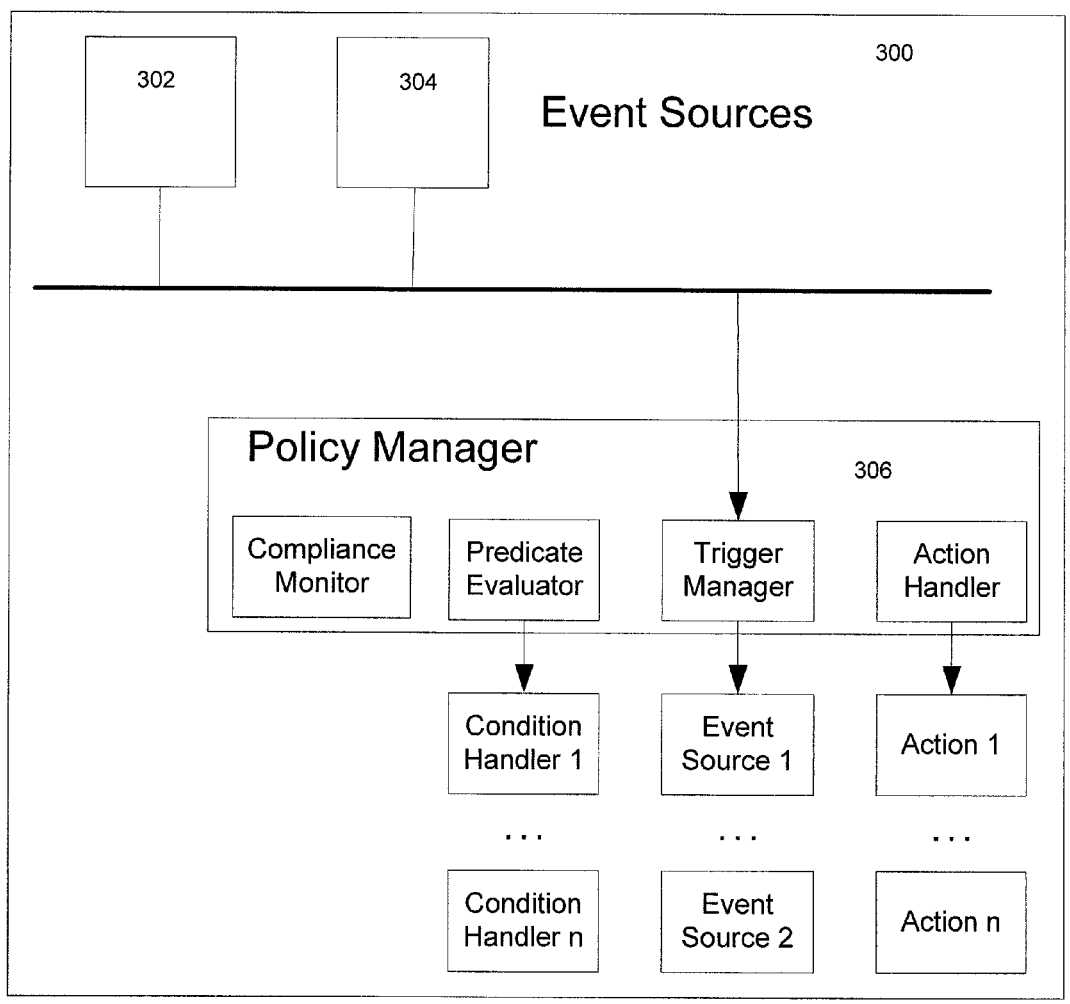
FIG. 3 illustrates a general architecture scheme for the client-side policy management process, under an embodiment.

The client-side process 105 includes functional components to active, deactivate, list, and enforce action rule sets on the client device. These components evaluate conditions and trigger actions when one or more conditions are true. As shown in FIG. 1, the client side policy management process 105 includes processing modules for event sources 142, as well as a policy manager component 144. The client side process provides functionality to activate, deactivate, and enforce policies on the mobile client device. Policy enforcement generally requires functionality to deliver events, evaluate conditions, and trigger actions when a group of conditions evaluates to a true state. Furthermore, the client side process acts to monitor policy compliance, and to detect and report policy violations. FIG. 3 illustrates a general overall architecture scheme for the client-side policy management process, under an embodiment. As shown in FIG. 3, the client-side process consists of the following components: event sources such as 302 and 304, and a policy manager component 306 that includes a predicate evaluator, action handler, trigger manager, and compliance monitor.

Event sources are the components responsible for generating triggers. Any number of event sources may be provided, such as event sources 302 and 304. An event source encapsulates a specific state and sends a notification to specified listeners whenever certain preconfigured conditions are met. For example, the timer event source generates an event every "x" seconds (where "x" is configurable). The policy manager 306 coordinates all policy-related client activities, including policy activation, deactivation, and enforcement. It leverages three components to achieve the task: a predicate evaluator, trigger manager, and action handler. The predicate evaluator is responsible for evaluating the conditions of the specified policy. To evaluate the conditions, it relies on condition handlers. Every condition handler knows how to evaluate a specific type of logical expression (e.g., >, <, and =). The action handler provides functionality to coordinate the execution of action instances. The action handler provides different semantics such as: best effort, or strictly all. The trigger manager maintains a table that maps triggers (generated by the event sources) to policies. When the trigger manager receives a trigger notification, it uses the table to determine the affected policies. Then, for each affected policy it sends a request to the policy manager to evaluate the policy. The policy manager leverages the predicate evaluator to evaluate the policy's predicate and if the predicate is true, the trigger manager interacts with the action handler to execute the actions. The compliance monitor checks and reports policy violations. Depending on implementation configurations, any number of condition handlers, event sources and actions from 1 to N, may be accommodated by the client-side process 300.

Figure 4A:
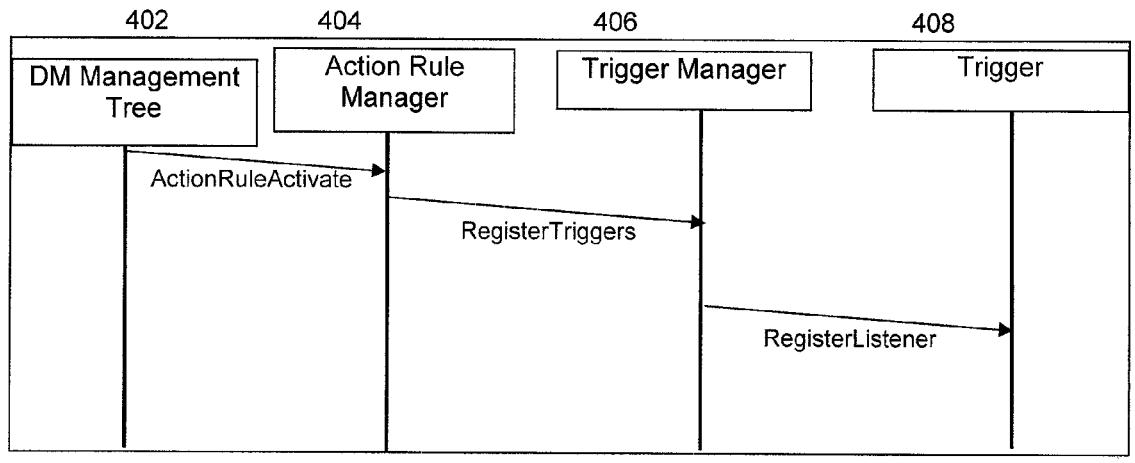
FIG. 4A illustrates the steps of registering an action rule, under an embodiment.

In one embodiment, a set sequence of actions is required for the operations involving registering action rules and evaluating action rules. Action rule registration is responsible for enabling an action rule locally in a mobile device. FIG. 4A illustrates the steps of registering an action rule under an embodiment. The process starts with a server device management process 402 creating a new management object (MO) with the action rule information and then invoking an executable command for the action rule manager 404 "Activate" operation. The action rule process receives the execute command. The action rule manager 404 registers at start up time with the action rule operation nodes (activate, deactivate, and remove) and therefore gets a callback with the URI of the action rule. Next, the action rule manager 404 invokes a RegisterTriggers process of Trigger Manager 406. This process parses the triggers' information from the MO, extracts the ID of each trigger, and finally invokes the appropriate Trigger 408 to register with it.

Figure 4B:
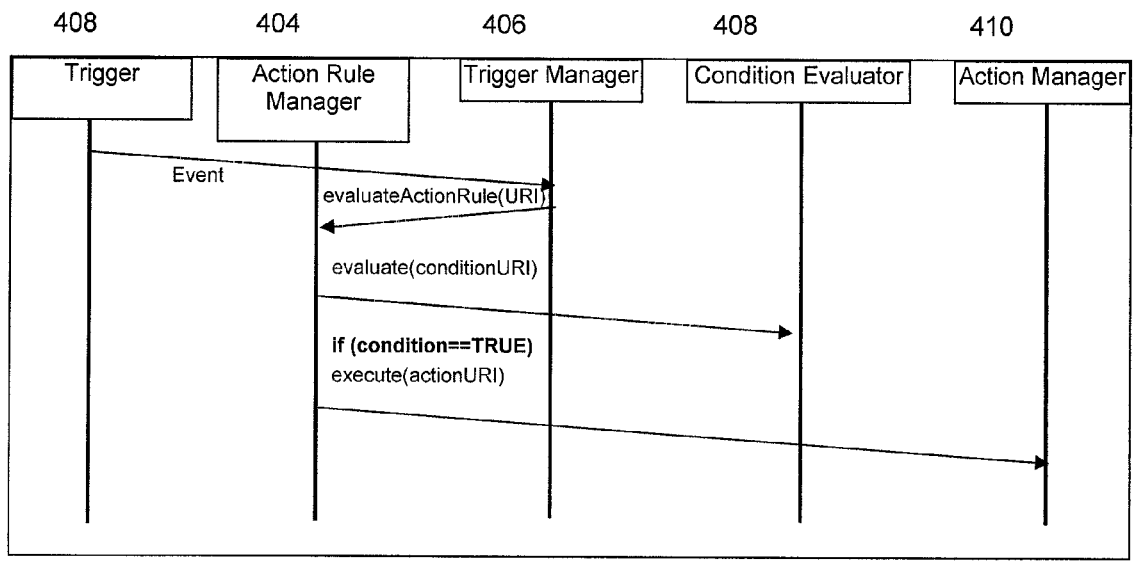
FIG. 4B illustrates the steps of evaluating an action rule, under an embodiment.

When a trigger is fired, the action rule manager is notified and an action rule evaluation process is performed. FIG. 4B illustrates an action rule evaluation process, under an embodiment. When the conditions specified at trigger registration time are met, the event source sends a notification to the trigger manager 406. The trigger manager retrieves the action rule URI from the event and invokes an EvaluateActionRule process on the action rule manager 404. The action rule manager evaluates the predicate of the action rule in the condition evaluator 408, and if the predicate is true, the action rule manager executes the action rule's actions through action manager 410.

Figure 5:
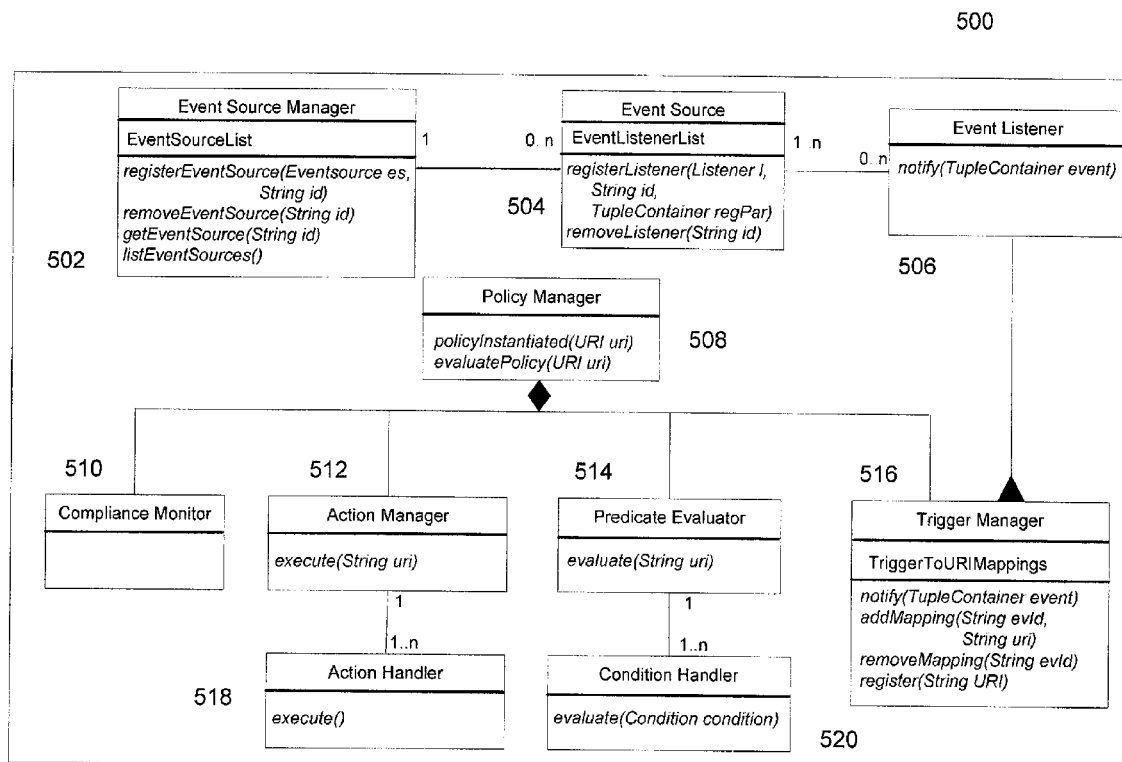
FIG. 5 illustrates a UML diagram for the components that define the client-side architecture of an intelligent mobile client, under an embodiment.

The client side process may be represented by a unified modeling language (UML) model that includes a set of graphical notation techniques to create an abstract model of the client system. FIG. 5 illustrates a UML diagram for the components that define the client-side architecture, under an embodiment. In the UML model 500 of FIG. 5, the event source manager 502 maintains a list of all the event sources registered in the system, and provides functionality to manage them. The state of the event source list is: EventSourceList. List with all the event sources registered. The methods of the event source list are as follows:

- addEventSource(EventSource es, String id). Registers a new event source. The method receives an event source and a string with the ID that will be assigned to it.
- removeEventSource(String id): Deletes the event source identified by "id"
- getEventSource: Returns the event source identified by "id"
- listEventSources: Returns a list with all the event sources' ids registered in the system.

An event source 504 implements the trigger functionality. It sends notifications to listeners whenever a set of conditions are met. These conditions depend on every event source. Event sources are built as dynamically loadable modules, and therefore, can be added to the system at runtime, and can also be deployed using mechanisms such as SCoMO (software component management object). Every event source has a unique ID. Upon registration with the event source manager, the event source ID is stored in a table handled by the event source manager so it becomes available to the rest of the system.

The state of the event listener list 506 is: EventListenerList: List with all the registered event listeners. The methods of the event listener list are as follows:

- addEventListener(EventListener el, String id, Tuplecontainer regPar): Registers a new event listener. The method receives an event listener, a string with the ID that will be assigned to it, and a tuple container that stores all parameters required to configure the behavior of the trigger. The tuple container stores the parameters as <name,value> entries.
- removeEventListener(String id): Deletes the event listener identified by "id"
- getEventListener(String id): Returns the event listener identified by "id"
- listEventListener( ): Returns a list with the ids of all event listeners registered in the system.

An event listener is an object that receives notifications from the event sources. Event sources invoke the notify (TupleContainer event) method when the subscription conditions are met. The input parameter is a tuple container with name and value pairs that describe the event. There are two compulsory parameters (EventID, and EventName) that identify the type of event.

The policy manager 508 is a central component of the client-side infrastructure 500. It leverages four components to implement its functionality: trigger manager 516, action manager 512, predicate evaluator 514, and compliance monitor 510. The policyInstantiated(URI uri) method is invoked by the management tree callback mechanism. The parameter is the URI to the newly instantiated policy. The evaluatePolicy (URI uri) method evaluates the policy conditions pointed by the URI. This process implies evaluating the predicates and invoking the associated actions if the predicates are true. The register(String URI) method receives the path to the policy triggers, parses the tree information, and registers with the appropriate event sources The trigger manager 516 is responsible for associating triggers to policies and, upon receiving a trigger, for retrieving the policies that are affected. The trigger manager is an event listener, and therefore, it receives notifications from the event sources. The state of the trigger manager is: TriggerToURIMappings. This is a table that associates a trigger to a policy's URI. Upon receiving a trigger event, the trigger manager checks this table to determine what are the policy (es) that have to be evaluated. The notify (TupleContainer event) method is invoked by the event sources. The input parameter contains information about the event. When the trigger manager receives an event, it extracts the event ID, and uses it to index the TriggerToURIMappings table. As a result, it obtains a list of policies that are associated to the event (trigger). The trigger manager iterates over the policies and invokes the "evaluatePolicy" method exported by the policy manager, which evaluates the policy predicate (predicate evaluator), and if the predicate is true, executes the policy actions (action manager). The addMapping(String evId, String uri) method stores a new mapping the TriggerToURIMappings table. The removeMapping(String evId, String uri) method removes a mapping from the TriggerToURIMappings table. If the second parameter (URI) is null, then the method removes all mappings associated to the provided event. If the second parameter is not null, the method only deletes the specified binding.

The predicate evaluator 514 is responsible for evaluating the conditions of a policy instance's predicate. This component delegates the actual evaluation to the appropriate condition handler according to the condition ID. The evaluate (String URI) method evaluates the conditions of the policy provided as a parameter. The parameter determines the location of the policy conditions' root node in the management tree. The method iterates over the subtree, extracts the condition ID for each condition, and uses this ID to index a table where the condition handlers are registered. Finally, it invokes the condition handler with the parameters extracted from the subtree.

Condition handlers 520 are components capable of evaluating a specific condition class (e.g., >, <, and string comparison). These condition handlers are registered with the predicate evaluator using a unique ID. Condition handlers can be registered dynamically with the system. The evaluate(Condition condition) method receives a condition instance, evaluates it, and returns a Boolean value.

The action manager 512 is responsible for executing the actions of a policy instance. This component delegates the actual execution to the appropriate action handler, according to the specific action ID. The execute(String URI) method executes the actions of the policy provided as a parameter. The parameter determines the location of the policy actions' root node in the management tree. The method iterates over the subtree, extracts the action ID for each condition, and uses this ID to index a table where the action handlers are registered. Finally, it invokes the action handler with the parameters extracted from the subtree.

Action handlers 518 are components capable of executing a specific action class (e.g., start application, stop application, and switch off camera). These action handlers are registered with the action manager using a unique ID. Action handlers can be registered dynamically with the system. The execute (Action action) method receives an action instance, and executes it. If the action execution fails, the action handler returns an exception. The action manager 512 is then responsible for deciding whether to execute the remaining action, stop the execution, and/or report the failure.

The compliance monitor 510 is generally responsible for checking that the mobile device adheres to the policies defined by the management server. It detects policy violations and reports them to the appropriate service, such as the server process.

The client-side process 500 is generally configured to accommodate new functionality in a manner that minimizes down time, and avoids requiring the reinstallation of the system each time a new feature is available. The overall client-side process can be divided into the two elements of the core infrastructure, and the policy building block handlers. The core infrastructure provides the basic functionality to enable policy management, whereas the policy handlers are the components capable of manipulating the three policy building blocks: triggers, conditions, and actions. In general, the core functionality is not dependent on the specific details of each policy instance. It simply orchestrates the interaction among the different policy building block handlers according to generic rules. On the other hand, the policy building block handlers (triggers, action handlers, and condition handlers) are tightly coupled to every specific policy instance. As a result, the client process is implemented to be flexible enough to incorporate new policy building block handlers at runtime, to accommodate new types of policies over the time. Furthermore, this flexibility also assists in configuring what policy building blocks a mobile device will support during device configuration or at start up time. This ability helps to create subsets of devices with different policy management capabilities depending, for example, on the device type or hardware characteristics.

The policy management client architecture leverages a dynamically configurable infrastructure that allows manipulating the available policy building block handlers at runtime. In one embodiment, this is accomplished by using dynamically loadable modules to implement the triggers, actions, and condition handlers. These modules can be deployed and installed at runtime, and as a result, new handlers are made available to the system.

An example of the action rule management client process is described as follows for a device that has already been shipped and is currently in use has the action rule framework infrastructure installed. If the carrier decides to monitor the battery drainage rate and send a notification if this rate is higher than a certain value, but the device does not have a trigger to monitor battery drainage and does not have an action handler to send a notification, the carrier uses a defined protocol, such as SCoMO, to deploy two new modules: battery trigger and notification action. The device receives the modules, detects that are action rule handlers and therefore registers them with the action rule system at runtime. The action rule (policy) framework loads the trigger module and registers it with the event source manager. It then loads the action handler and registers it with the action manager. After registration, both the trigger and the action handler IDs are available and ready to use, and the action rule for the policy can be enforced.

Server-Side Process

The overall policy management framework that controls the client-side policy management process on the mobile client device is controlled by a server-side process 112, as shown in FIG. 1. The server-side policy management process 112 comprises several distinct functional blocks including policy creator 122, a group policy manager process 124, a device policy manager process 126, and a user interface that allows interaction with a system administrator 140. The server-side management system 112 is configured to implement a policy representation that is relatively simple and standards-based, and addresses a wide variety of use case scenarios. These policy representations can be loaded and stored in a data store 120 of server 104. In one embodiment, the server is configured to upload new policies dynamically to the mobile devices based on different criteria. In an enterprise implementation, one primary criterion is the authority group the subscriber belongs to, and other criteria can include device types, deployment locations, deployment times, and other similar criteria.

The policy creator component 122 allows the system administrator user 140 to create new instances of policies out of the needed components (triggers, conditions, actions) as a state machine, as well as to edit/update existing policies, delete existing policies, or import and export policy instances. In one embodiment, the user interface 128 presents to user 140 a list of existing policies as state machines. For creating or editing a policy, parts of the user interface 128 are dynamic as they represent the components. After the user builds a state machine based on the triggers, conditions, and actions, the policy can be saved to data store 120. The import and delete functions simply change the list of available policies for the user. On export the user can save the policy instance as file.

The group policy manager tool allows the user to manage target groups and associated policies. In general, two views available, a target group view, and a policy view. The target group view allows the user to view all target groups, create, edit, delete a target group, and view policies by a selected target group. The available tasks in the view include adding or removing a policy to or from selected target group, activate or deactivate a policy, check if policy compliance is up to date, synchronize with the device. In this embodiment, the user interface presents a list of existing target groups. For any target group it is possible to view the associated policies. This new view contains a list of these policies and the mentioned actions are available. Adding a policy will show a list of all available policies where the user can select one. When checking the compliance for one or more policies a list is populated containing devices that are out of sync and why. The user has the option to synchronize to the device and so to enforce the compliance.

The second view in the group policy manager tool is the policy view. This view allows the user to view all policies, and view target groups by selected policy. In this case, the user interface shows all available policies and the user can view the associated target groups for a policy.

Figure 6:
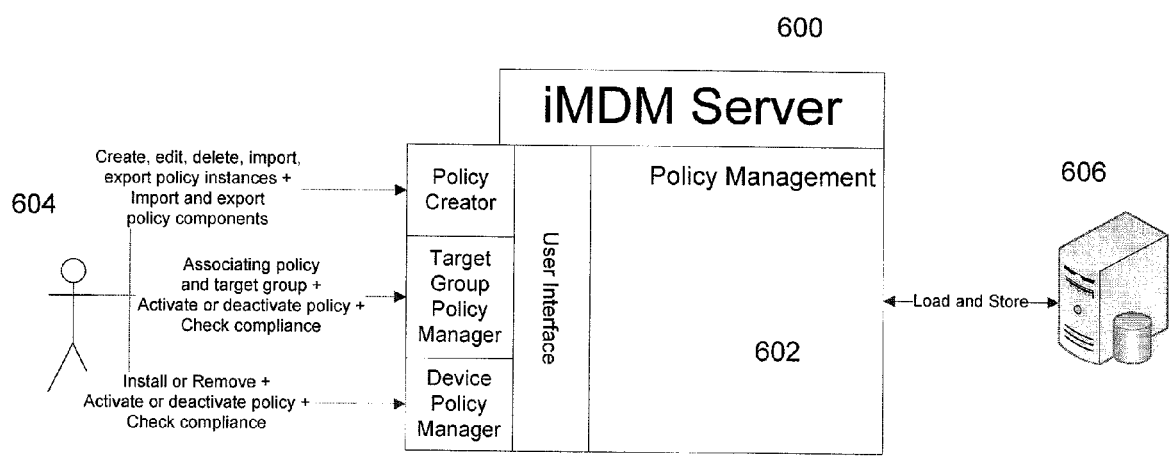
FIG. 6 illustrates an MDM server for use with managed remote client devices, under an embodiment.

In one embodiment, the policy management server side process is built on an MDM platform that provides a modular architecture that simplifies the integration of services such as policy management. The MDM platform implements the OMA DM protocol, which enables standard management of remote mobile devices, which is one of the requirements for policy management. FIG. 6 illustrates an MDM server 600 for use with managed remote client devices, under an embodiment. The server-side services include a policy creator that creates new policies out of the needed components (triggers, conditions, actions). Through an interface, an administrator 604 can edit/update existing policies, delete existing policies, or import and export policy instances. The administrator can also able to import, export, and delete components of the MDM instance.

The policy management component 602 includes a target group policy manager that allows the administrator to manage target groups and associated policies. Through the user interface, views available for the target group and for the policies. In the target group view, the administrator can view all target groups; create, edit, delete a target group; and view policies by selected target group. The user can also add or remove a policy to/from selected target group (will not yet send to the device); activate or deactivate policy (will not yet send to the device); check policy compliance (up to date) and possibility to sync with device (install, remove, activate, deactivate, or update through a mass job. In the policy view, the administrator can view all policies or view target groups by selected policy.

The policy management component 602 includes a device/subscription policy manager that allows the administrator to manage existing policies for a single client device. Through the user interface, the user can view all policies on the device (possibility to filter by direct and indirect); install, update, remove, activate or deactivate direct policies through a single job; update, remove, activate or deactivate indirect policies; and check policy compliance (up to date) for indirect policies and possibility to sync with device The workflow for client interaction allows the user to query, install, update, remove, activate, deactivate policies.

In one embodiment, the server 600 can be configured to store the management policies for a number of different client devices. The different clients can be organized by one or more different characteristics, such as device type, location, user groups, service groups, time zones, and so on. These policies can be stored in an organized database accessible to the server. These grouped policies can then be distributed to specific targeted client devices to allow for efficient reconfiguration based on the relevant characteristic.

Implementation of Mobile Device Management

In one embodiment, the mobile device policy management framework of FIG. 1 includes a system configured to manage policies, including decision policies and active policies, on mobile devices is described above that includes a device policy repository, a policy decision point, a decision policy enforcer, and an active policy enforcer. The system includes a method for enforcing policies on mobile devices that proactively monitors the execution environment and automatically triggers active policies. The method further exports an interface and provides functionality to evaluate and enforce decision policies. The system can combine policies from different sources, including detecting and avoiding policy conflicts.

In one embodiment, the client-side process 105 of FIG. 1 is implemented as an intelligent management agent residing in the mobile client device 102. The intelligent management agent relies on communication between the client-side mobile management process 105 residing on a mobile device and the server-side mobile device management (MDM) process 112 residing in server 104.

A standard management protocol, such as OMA DM (Open Mobile Alliance Device Management), is used by the server retrieve, analyze and set management properties values for the mobile client. In general, the OMA DM specification is optimized for management of small mobile devices such as cell phones, PDAs and palm top computers, but can be used to manage virtually any type of networked device. The device management function is intended to support the following typical uses: provisioning including configuration of the device, enabling and disabling features; software upgrades, fault management, and the like.

In one embodiment, a client-side process may be downloaded to the client device using the OMA DM protocol and SCoMO (Software Component Management Object) standard that specifies the protocol to manage software remotely on mobile devices. SCoMO generally dictates the installation, uninstallation, launching and termination of software on mobile devices. The mobile client 102 of FIG. 1, and every other device that supports OMA DM contains a management tree. The management tree contains and organizes all the available management objects so that the server 104 can access every node directly through a unique URI (uniform resource identifier).

As stated previously, the policies are represented in the server using XML structures for the respective action-condition-trigger components. On the mobile client device, each policy is represented as a subtree. This mechanism leverages the subtree structure provided by OMA DM and facilitates execution on the mobile client. In an embodiment, the server leverages XML to store the policies, but the client does not. The client uses the OMA DM management tree structure to store the information. The server parses the XML document and automatically creates a subtree with all the information. The server then creates the subtree on the client device remotely.

In one embodiment, a software manager process may be provided to facilitate download of the client-side management process to the mobile client device. In one implementation, the user has control over the software to be downloaded (user pull scenario), and applications may be provided by a third party server. The user first accesses the server computer software management portal, whether on the mobile device itself or through a separate computer. The portal, where the application and its attributes are selected communicates with any third party application or content server. The MDM server initiates a control connection to the mobile client, after which a connection to the content server is authorized and established. In another implementation, the operator or enterprise controls the application download (operator push scenario). For example, in an enterprise setting, the IT department may mandate the download of an application patch or new anti-virus signature file. Here, the enterprise or operator sets the download in motion through an MDM console. The MDM server and any third party content server then establish connections to the mobile device.

In one embodiment, a configuration manager in a carrier suite of the MDM server manages configuration settings on the mobile device over the wireless (cellular) network. For OMA DM applications, the carrier suite configures virtually any application on the mobile device for which configuration is handled by setting the values of objects in the OMA DM management tree. Certain OMA DM applications may be predefined, such as bootstrap routines, diagnostics, and other applications.

MDM Managed Client

The client device 120 is typically a mobile client device that executes a number of different application programs that provide various functions or utilities, such as communication, entertainment, navigation, information management, and basic computing functions. Mobile client 120 may be a cell phone, smartphone, or any mobile communication device that provides access to the network and has a sufficient degree of user input and processing capability to implement policies and execute tasks managed by the MDM server 102. In some computing environments, the client device may also be embodied in a standard mobile computing device, such as a notebook computer, personal digital assistant, game console, media playback unit, or similar computing device. Such client computers may be coupled to the server computer over a wired connection, a wireless connection or any combination thereof.

In one embodiment, the mobile device includes an intelligent management agent that communicates with the processing elements of the MDM carrier suite server 102. In one embodiment, a standard management protocol, such as OMA DM (Open Mobile Alliance Device Management), is used by the server retrieve, analyze and set management properties values for the mobile client.

Figure 7:
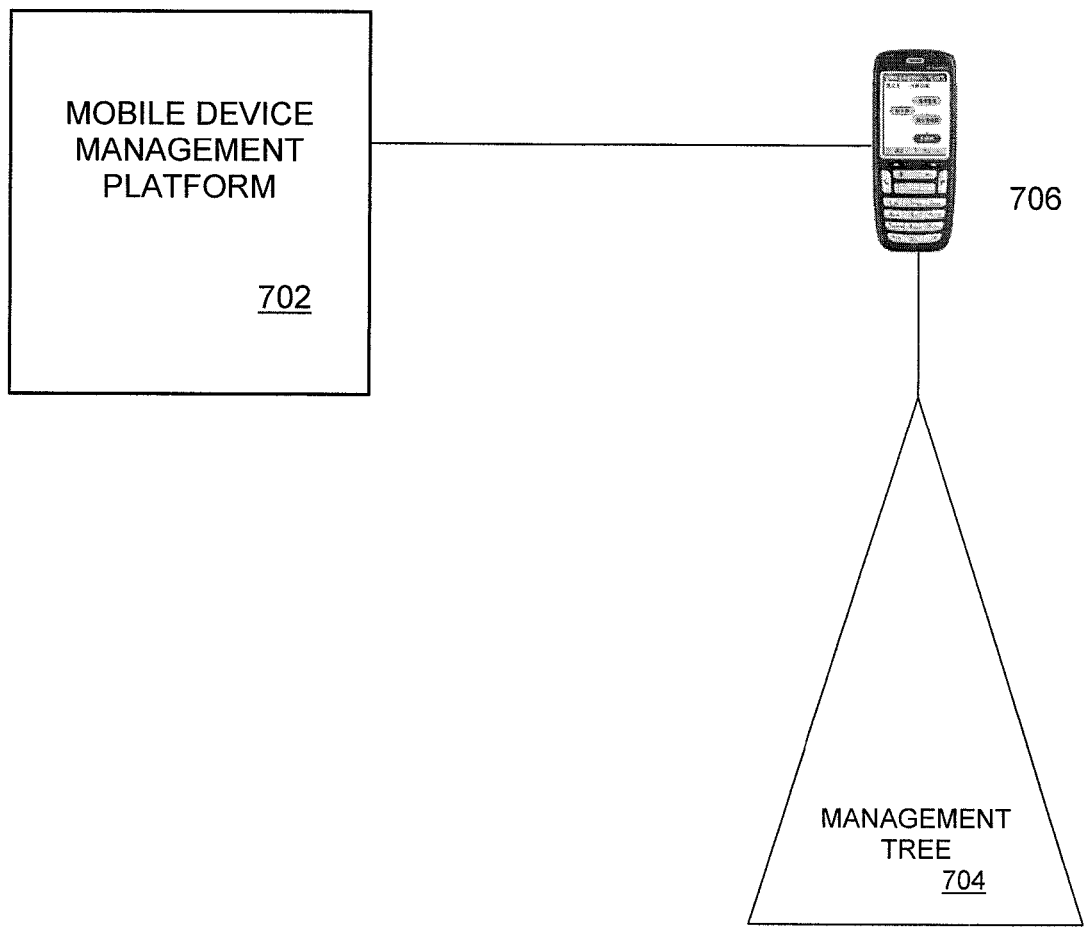
FIG. 7 illustrates a system for mobile device management between an MDM platform and an OMA DM enabled mobile device, under an embodiment.

FIG. 7 illustrates a system for mobile device management between a MDM platform and an OMA DM enabled mobile device, under an embodiment. Using the OMA DM protocol, the server 702 can retrieve, analyze and set management property values stored in the management tree 704 of mobile device 706. The device management function is intended to support the following typical uses: provisioning including configuration of the device, enabling and disabling features; software upgrades, fault management, and the like. In one embodiment, the configuration manager 104 in the carrier suite of the MDM server 102 manages configuration settings on the mobile device over the wireless (cellular) network. For OMA DM applications, the carrier suite configures virtually any application on the mobile device for which configuration is handled by setting the values of objects in the OMA DM management tree. Certain OMA DM applications may be predefined, such as bootstrap routines, diagnostics, and other applications.

Figure 8:
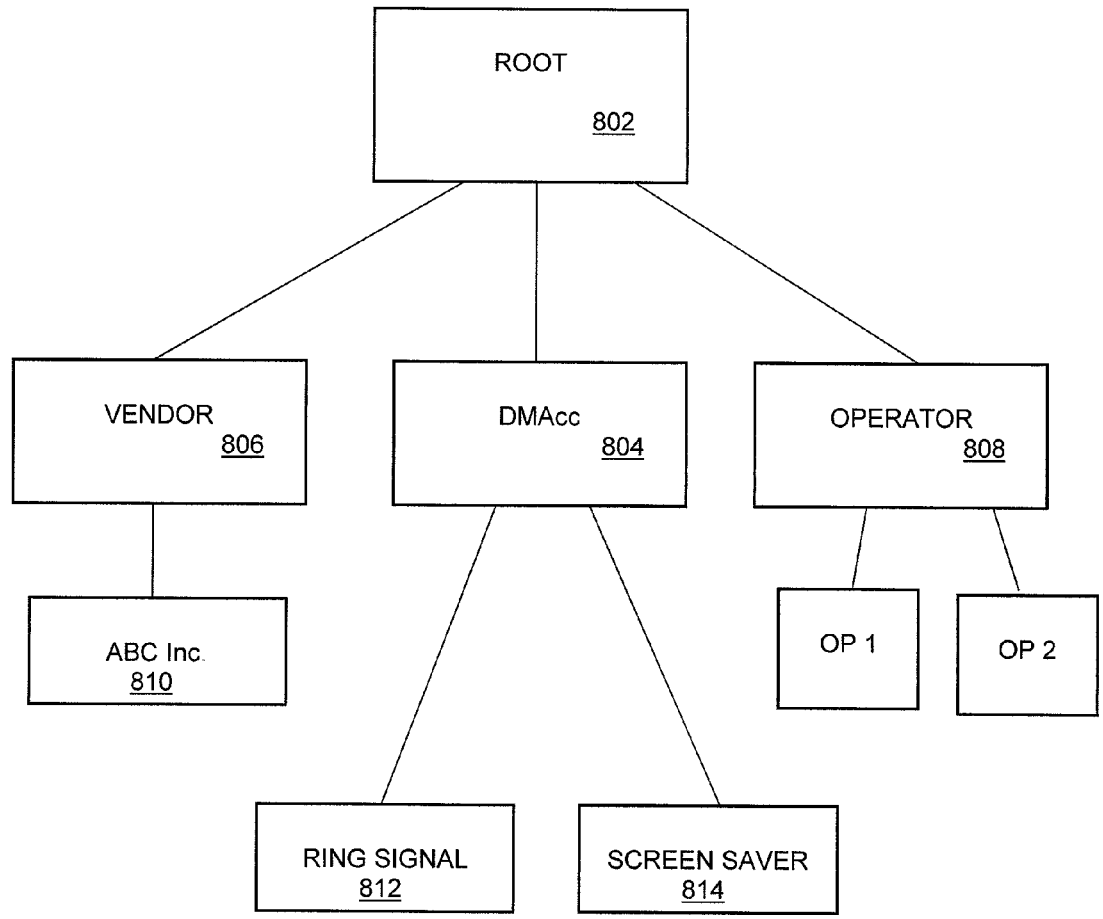
FIG. 8 illustrates an example OMADM management tree for a mobile client device, under an embodiment.

The management tree 704 represents any type of configuration aspect of the mobile device and comprises a number of nodes storing operational parameters relating to relevant settings, functions, or the like. FIG. 8 illustrates an example OMA DM management tree for a mobile client device, under an embodiment. The management tree includes a root node 802 and a number of subnodes under this root node. These subnodes can include a DMAcc node 804, a vendor node 806, and an operator node 808. Each node has an associated URI. For example, to access the "ABC Inc" node in the management tree of FIG. 8, the correct URI is "./DMAcc/ABCInc". The DMAcc node 804 generally specifies the settings for the device management client in a managed device. Any number of functions, applications or relevant settings for the client can be specified by subnodes in the management tree. For the example of FIG. 8, subnodes are shown for the ring signal 812 and screen saver 814 settings of the mobile client. These and any other settings may be configured through firmware updates provided by the MDM server administrator, a carrier service administrator, or any other third party provider.

The management tree contains and organizes all the available management objects so that the server can access every node directly through a unique URI (uniform resource identifier). The management tree comprises a number of hierarchically organized nodes. An interior node can have an unlimited number of child nodes, while a leaf node must contain a value, including null. Each node has a set of run-time properties associated with it. All properties are only valid for the associated node. An access control list (ACL) for a represents which server can manipulate that node. The manipulation includes adding a child node, getting the node's properties, replacing this node, or deleting this node, as well as other run-time properties. The management tree, or any subtree for the mobile device can be accessed via an OMA message invocation from the MDM server platform 802.

In one embodiment, the mobile device policy management system includes mechanisms that augment node management properties. In general, the structure of management information defines a management node. The method augments set of standard management properties to include following set: status, refresh interval, state (enabled/disabled), and logging flag. In addition the management properties include minor actions, thresholds and simple rules, as well as major actions, thresholds and simple rules. The "status" property is equivalent to a perceived node severity, i.e., none, minor, or major. The "refresh" interval defines a period for a rule evaluation. The management state allows the system to suspend or resume node evaluation. The logging flag controls logging policy for a given node. A property group is repeated for each supported severity level. The "action" property presents an action that is fired if a simple rule is satisfied. The "threshold" presents a threshold value used as a rule parameter.

In one embodiment, the system defines mobile agent behavior which requires periodic monitoring for each active monitoring node in a device management tree. The process includes rule evaluation, logging, and executing corrective action. The mobile agent combines an execution of standard OMA messages sent by the MDM and permanent monitoring of active nodes.

Figure 9:
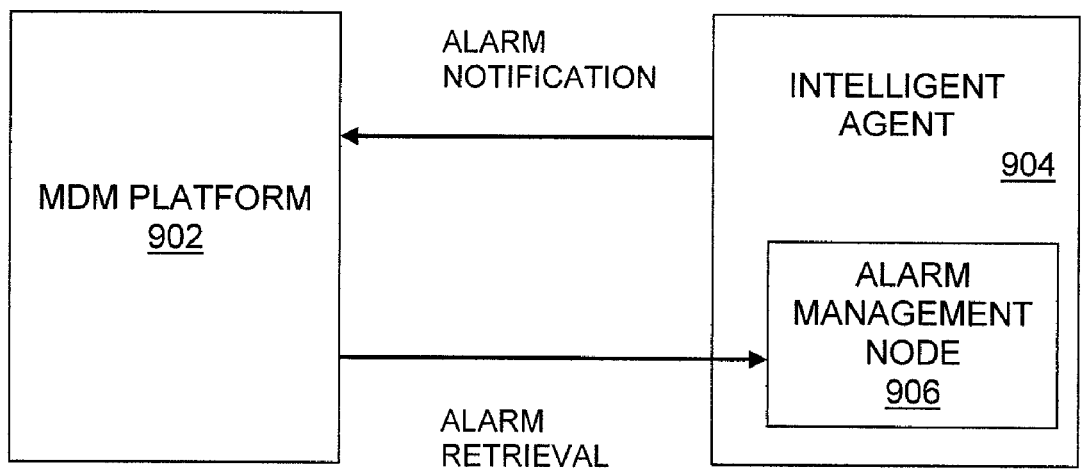
FIG. 9 is a block diagram that illustrates a system for providing alarm notification and alarm retrieval for an intelligent agent, under an embodiment.

The mobile agent process can also include a function for providing notation of alarms. For example, each time a simple rule is satisfied, an agent generates an alarm record that includes node URI, node value, severity timestamp and perceived severity. An agent trying to send alarm notifications to a server could retrieve all alarms using a dedicated management node. FIG. 9 is a block diagram that illustrates a system for providing alarm notification and alarm retrieval for an intelligent agent, under an embodiment. As shown in FIG. 9, the intelligent agent 904 includes an alarm management node 906. The agent communicates with MDM platform and provides alarm notifications to the platform and retrieves alarms from the platform in the alarm management node 906.

In one embodiment, an intelligent agent provides a status aggregation for each subtree in a device management tree. This allows the server to get an overall device status without a need to query individual nodes.

The MDM server of FIG. 6 can be used to store and distribute a monitoring configuration. Under this embodiment, a procedure defines a monitoring configuration that is based on a set of augmented node properties. The management server is used to create, store and distribute monitoring configurations.

Through the client-side and server-side policy processing modules of FIG. 1, a number of different management functions and values can be analyzed and stored in a server computer coupled to a number of mobile client devices over a wireless network. Through the client-side process, an intelligent mobile client is capable of implementing these policies and essentially managing itself based on initial instructions and policies provided by a server that are transferred to the client by the OMA DM protocol. Any practical number of conditions and actions can be accommodated including operational functions, such as turning off functions if battery low levels are detected, or usage functions, such as limiting user access based on user privileges.

Using this architecture, a comprehensive remote device provisioning system can be implemented wherein policy rules are defined for certain subsets of deployed devices. Customized modules, patches, updates, and the like can then be transmitted to the devices, and each device can implement and execute the appropriate modules. This greatly reduces the effort involved in current provisioning systems in which a universal module is sent to all devices and then the user must implement and manage the updates himself or herself, or the system administrator must undertake the effort to update and manage each client device separately. The policy definition and distribution scheme provided by the client-side process in conjunction with the server-side MDM platform greatly enhances autonomous operation of distributed mobile devices with minimal user and system administrator input.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

Components of the systems and methods described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods described herein is not intended to be exhaustive or to limit the systems and methods described to the precise form disclosed. While specific embodiments of, and examples for, the systems and methods described herein are described herein for illustrative purposes, various equivalent modifications are possible within the scope of other systems and methods, as those skilled in the relevant art will recognize. The teachings of the systems and methods described herein provided herein can be applied to other processing systems and methods, not only for the systems and methods described above.

The elements and acts of the various embodiments described above can be combined to provide further embodiments. These and other changes can be made to the systems and methods described herein in light of the above detailed description.

What is claimed is:

1. A method of managing a mobile client device over a network, comprising:
    storing management property values in one or more nodes of a management tree of the mobile client device;
    analyzing and setting at least some of the management values in a server computer coupled to the mobile client device over a wireless network;
    defining a set of management properties to include a status property representing a node severity value, and a property group consisting of a rule, an action property representing an action that is executed if the rule is satisfied, and a threshold value that represents a minimum value that is used as a rule parameter.

2. The method of claim 1 wherein the mobile client device comprises an Open Mobile Alliance Device Management (OMA DM) enabled mobile client device.

3. The method of claim 2 wherein each node consists of one or more action rule sets, each action rule set comprising:
    trigger events denoting a change in state of a variable of interest to an action property;
    conditions comprising a yes or no value associated with the variable of interest; and
    actions comprising a task to be executed by the mobile device when a corresponding condition is true.

4. The method of claim 3 wherein the node severity value assigned a severity level selected from the group consisting of: none minor, and major.

5. The method of claim 3 wherein the management properties further comprise a refresh interval that defines a period of time for rule evaluation by the server computer.

6. The method of claim 5 wherein the management properties further comprise a logging flag that controls a logging policy for a defined node.

7. The method of claim 1 further comprising periodically monitoring each active node in the management tree.

8. The method of claim 7 wherein the periodic monitoring step comprises:
    evaluating each rule;
    logging each rule; and
    executing corrective action in the event of a fault condition.

9. The method of claim 7 further comprising:
    generating an alarm record each time that a rule is satisfied, wherein the alarm record includes a resource identifier for the node for which the rule is satisfied, a severity timestamp and a severity value.

10. The method of claim 9 further comprising receiving all alarm records in a dedicated management node of the server computer.

11. The method of claim 1 wherein the management tree comprises a plurality of subtrees, the method further comprising aggregating a status for each subtree to obtain an overall status of the mobile device.

12. A managed object mobile device, comprising:
- an intelligent management agent storing management property values of the mobile device in one or more nodes of a management tree of the mobile client device, and defining a set of management properties to include a status property representing a node severity value, and a property group consisting of a rule, an action property representing an action that is executed if the rule is satisfied, and a threshold value that represents a minimum value that is used as a rule parameter; and
- a transmission module to transmit management tree data to a remotely coupled server computer configured to analyze and set at least some of the management values of the management tree.

13. The device of claim 12 wherein the mobile device comprises an Open Mobile Alliance Device Management (OMA DM) enabled client device, and wherein the transmission utilizes the OMA DM communication protocol.

14. The device of claim 13 wherein each node consists of one or more action rule sets, each action rule set comprising:
- trigger events denoting a change in state of a variable of interest to an action property;
- conditions comprising a yes or no value associated with the variable of interest; and
- actions comprising a task to be executed by the mobile device when a corresponding condition is true.

15. The device of claim 14 wherein the node severity value assigned a severity level selected from the group consisting of: none minor, and major.

16. The device of claim 15 wherein the management properties further comprise:
- a refresh interval that defines a period of time for rule evaluation by the server computer; and
- a logging flag that controls a logging policy for a defined node.

17. The device of claim 13 further comprising a monitoring module periodically monitoring each active node in the management tree, and wherein periodic monitoring comprises: evaluating each rule, logging each rule, and executing corrective action in the event of a fault condition.

18. The device of claim 17 further comprising an alarm management node configured to generate an alarm record each time that a rule is satisfied, wherein the alarm record includes a resource identifier for the node for which the rule is satisfied, a severity timestamp and a severity value.

19. The device of claim 18 wherein all alarm records are received in a dedicated management node of the server computer.

20. The device of claim 19 wherein the management tree comprises a plurality of subtrees, the method further comprising aggregating a status for each subtree to obtain an overall status of the mobile device.

21. A system to define and enforce policies on an Open Mobile Alliance Device Management (OMA DM) enabled mobile client device coupled to a server computer over a computer network, comprising:
- a server-side process configured to allow creation, modification and transmission of defined policies to the mobile client device, wherein the defined policies comprise management properties that include a status property representing a node severity value, and a property group consisting of a rule, an action property representing an action that is executed if the rule is satisfied, and a threshold value that represents a minimum value that is used as a rule parameter;
- a data store storing the defined policies on the basis of implementation requirements defined by one or more characteristics of the mobile client device, one or more characteristics of a user of the mobile client device, and one or more scheduling parameters;
- a transmission process transmitting the defined policies to the mobile client device in accordance with the implementation requirements;
- a client-side process executed on the mobile client device and configured store the defined policies in an OMA DM management tree in the mobile client device as management objects, wherein each policy of the defined policies is represented as a subnode of the management tree, the client-side process further configured to automatically implement the defined policies in accordance with the implementation requirements.

22. The system of claim 21 wherein the one or more characteristics of a user are selected from the group consisting of: user identity, user privileges, user location, and user age.

23. The system of claim 22 wherein the one or more characteristics of the mobile client device are selected from the group consisting of: device location, device access service type, and device manufacturer and model.

* * * * *